(12) United States Patent
Mawby

(10) Patent No.: US 9,958,102 B2
(45) Date of Patent: May 1, 2018

(54) CONDENSATE REMOVAL DEVICE

(71) Applicant: Thermal Energy International (UK) Limited, Bristol Somerset (GB)

(72) Inventor: Sam Mawby, Bristol Somerset (GB)

(73) Assignee: THERMAL ENERGY INTERNATIONAL (UK) LIMITED, Bristol Somerset (GB)

( * ) Notice: Subject to any disclaimer, the term of this patent is extended or adjusted under 35 U.S.C. 154(b) by 417 days.

(21) Appl. No.: 14/773,804

(22) PCT Filed: Mar. 17, 2014

(86) PCT No.: PCT/GB2014/050839
§ 371 (c)(1),
(2) Date: Sep. 9, 2015

(87) PCT Pub. No.: WO2014/147381
PCT Pub. Date: Sep. 25, 2014

(65) Prior Publication Data
US 2016/0018041 A1    Jan. 21, 2016

(30) Foreign Application Priority Data
Mar. 18, 2013   (GB) .................................. 1304935.8

(51) Int. Cl.
*F16L 55/07*     (2006.01)
*F16L 55/24*     (2006.01)
*F16T 1/34*      (2006.01)
*B03C 1/28*      (2006.01)

(52) U.S. Cl.
CPC .............. *F16L 55/07* (2013.01); *B03C 1/286* (2013.01); *F16L 55/24* (2013.01); *F16T 1/34* (2013.01); *B03C 2201/18* (2013.01)

(58) Field of Classification Search
CPC .......... F16L 55/07; F16L 55/24; B03C 1/286; B03C 2201/18
See application file for complete search history.

(56) References Cited

U.S. PATENT DOCUMENTS 4,745,943 A * 5/1988 Mortensen ............. B01D 45/04
137/177

FOREIGN PATENT DOCUMENTS

| AU | 708 590  | 8/1999 |
| GB | 2 304 300 | 3/1997 |
| JP | H01 131398 | 5/1989 |
| JP | H06 6896 | 1/1994 |

OTHER PUBLICATIONS

The International Search Report for PCT/GB2014/050839, dated Mar. 11, 2015.*

* cited by examiner

*Primary Examiner* — David A Reifsnyder
(74) *Attorney, Agent, or Firm* — Leason Ellis LLP

(57) ABSTRACT

An orifice condensate trap (i.e. a condensate removal device (10) having a condensate drainage channel (26) with a constricted passage (30) therein) in which a magnet (50) is disposed upstream of the orifice to capture impurities, e.g. magnetic particles, suspended or otherwise carried in the condensable gas or condensate. The magnet may be used in tandem with a mechanical filter, e.g. strainer. The magnet may be formed as part of a cap or plug (48) for closing an access opening (36) opposite to an upstream opening of the constricted passage (30). For example, the plug (48) may be formed of magnetic material, e.g. a magnetic variant of stainless steel.

13 Claims, 3 Drawing Sheets

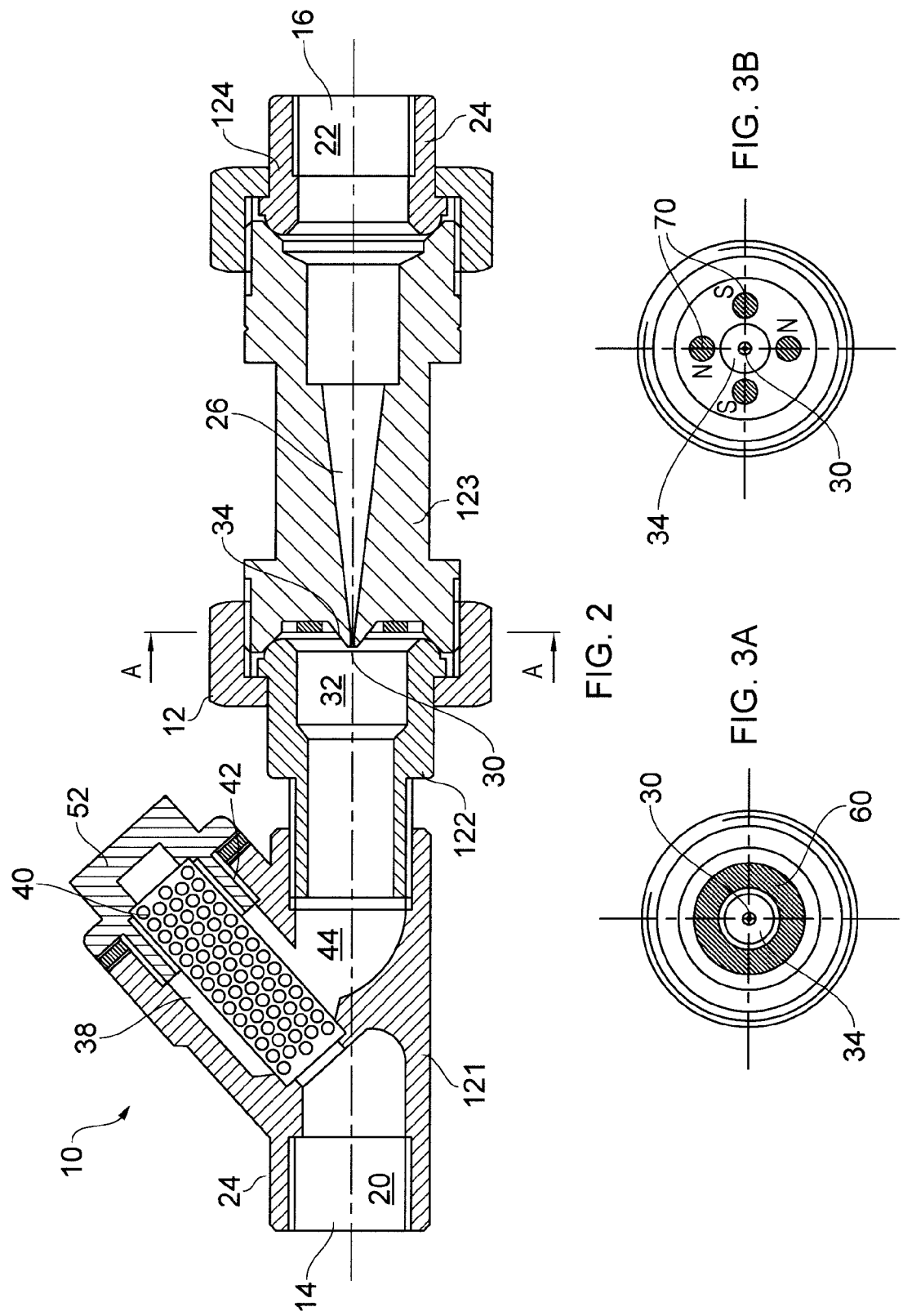

CONDENSATE REMOVAL DEVICE

CROSS-REFERENCE TO RELATED APPLICATIONS

This application is a U.S. National Stage Application under 35 U.S.C. § 371 of International Patent Application No. PCT/GB2014/050839, filed Mar. 17, 2014, which claims priority to United Kingdom Patent Application No. GB1304935.8, filed Mar. 18, 2013, the contents of which are hereby incorporated by reference in their respective entireties.

FIELD OF THE INVENTION

The invention relates to devices for removing liquid condensate from gas-conveyed heat transfer systems whilst restricting gas escape. Such devices are often used for removing condensate from steam-conveying pipelines, where they are known as steam traps.

BACKGROUND TO THE INVENTION

Steam is commonly used in industry as a medium for transporting heat energy from a central location via suitable pipelines to its point of use. The heat energy conveyed in the steam may be released at a suitable point by causing a phase change of the steam from as to liquid. The phase change releases latent heat from the steam and causes liquid condensate to form.

The condensate and any trapped air needs to be removed from the pipelines, because its presence can cause corrosion and reduce the system's heat transfer efficiency. However, any device for removing condensate also needs to prevent steam from escaping, as this also reduces the system's heat transfer efficiency and may waste the energy transported by that steam.

GB 2 304 300 describes an example of a continuous flow fixed orifice (CFFO) steam trap. In such devices, an orifice is located in the flow path of steam travelling through a pipeline. The size of the orifice is chosen carefully such that the condensate, which flows through it much more slowly than the steam, acts to block the steam from passing. The diameter of the hole can be very small, e.g. about 0.4 mm in some cases.

Another type of orifice steam trap, known as a venturi orifice trap, has the orifice formed as part of a venturi, i.e. a conduit having a constricted passage therein, the constricted passage having a smaller cross-sectional area then the remainder of the conduit. In venturi orifice traps, the orifice is provided in the constricted part of the venturi, whereby condensate passing through the orifice enters channel that opens out (e.g. flares outwardly) in the direction of flow. The orifice may thus be provided at the upstream end of a channel having an increasing cross-sectional area. The pressure drop after the orifice causes flash steam to form from the saturated condensate, whereby the venturi restriction is understood to regulate the condensate flow. Such channels have been used in venturi orifice steam trap demonstrated to operate over varying condensate flows without passing live steam. U.S. Pat. No. 4,745,943 describes such an arrangement. Venturi orifice traps are used in systems that exhibit varying loads, e.g. in which the amount of condensate and hence the flow rate of condensate through the trap varies over time (e.g. depending on the level of demand experiences by the heat transfer system).

It is important that the small hole in an orifice trap should not be blocked by debris or particulate matter carried in the condensate or condensable gas. Sufficient flow rate must be maintained through the hole to prevent build-up of condensate in the trap and thereby minimise corrosion. The debris itself may also cause corrosion. GB 2 478 536 describes a steam trap incorporating a perforated barrier upstream of the orifice to filter debris and prevent blocking of the orifice.

SUMMARY OF THE INVENTION

At its most general, the present invention provides an orifice condensate trap in which a magnet is disposed upstream of the orifice to capture impurities, e.g. magnetic particles, suspended or otherwise carried in the condensable gas or condensate. The magnet may be used in tandem with a mechanical filter, i.e. the magnet may act as a secondary filter, e.g. downstream of a mechanical filter or strainer. Fewer impurities reach the orifice, reducing the likelihood of formation of a partial or complete blockage of the orifice. By capturing debris in this manner, the time period between maintenance inspections can be increased. In particular, the magnet may capture insoluble particulate ferric oxide (or rust particles) which may foul or block the trap and result in damage. In addition, metal ions flowing in the condensate, e.g. copper (II) ions, may be attracted to the magnet. These may be retained once they are stationary on the magnet by the adsorbed ferric oxide.

The term "magnet" as used herein is understood to encompass any element or arrangement which can be used to effect or generate a magnetic field in the condensate trap. As such, it may include permanently magnetic materials, i.e. intrinsic magnets, or materials or structures in which a magnetic field can be induced, e.g. an electromagnet, suitable inductive circuitry or the like. Permanent magnetic material is preferred, for simplicity of construction.

Accordingly, the present invention may provide a condensate removal device for mounting in a pipeline, the device comprising: an inlet connectable to the pipeline to receive a condensable gas flow; an outlet connectable to the pipeline downstream of the inlet; a condensate drainage channel providing fluid communication between the inlet and outlet, which includes a constricted passage that is occludable by condensate flow therethrough to restrict condensable gas flow therethrough; and a magnet, disposed between the inlet and the constricted passage. In use, the magnet attracts magnetic debris in the condensate flow, which is captured and retained on a retention surface within the device that is separated from the constricted passage. The magnetic debris can therefore be kept clear of the constricted passage. The retention surface may be a surface of the magnet itself.

A flow path for the condensable gas and condensate is defined by the device between the inlet and the outlet. The inlet may comprise an inlet chamber, and the outlet may comprise an outlet chamber. The flow path may comprise a passageway extending from the inlet chamber to the outlet chamber, the passageway having one or more sub-chambers. The passageway may be linear, in which case the sub-chambers may lie coaxially with the axis of the pipeline in which the device is mounted. However, the passageway may also be convoluted, e.g. may comprise two or more bends, which may allow the sub-chambers to be located in regions offset from (e.g. at an angle to) the pipeline axis. This may have the advantage of permitting easier access to the sub-chambers, e.g. for cleaning or clearing debris from the retention surface, etc. Preferably the magnet is mounted in a sub-chamber on the passageway that is offset from the pipeline axis through the device. As discussed below, the sub-chamber containing the magnet may be a drainage sub-chamber which has the entrance to the constricted passage on its downstream wall.

The constricted passage, which may be the narrowest portion of the condensate drainage channel, may correspond to and perform the functions of an orifice in an orifice steam trap as discussed above. The constricted passage may be arranged to substantially prevent condensable gas flow therethrough in operation.

Thus, the cross-sectional area of the constricted passage, which may be circular, may be selected to permit condensate flowing therethrough to occlude the condensate drainage channel to prevent gas from flowing therethrough. The constricted passage may have a constant cross-sectional area. The constricted passage may be formed in an impermeable barrier that separates (e.g. isolates) the inlet from the outlet, e.g. by drilling, punching, lasering or the like. The barrier may be part of an insert, receivable in the device, or may be an integrally formed part of the device.

The condensate drainage channel may increase in cross-sectional area as it extends away from the constricted passage towards the outlet. The condensate drainage channel may thus resemble a venturi. The Increase in cross-sectional area of the condensate drainage channel away from (i.e. downstream from) the constricted passage may occur gradually, e.g. as an outward tapering of the channel, or stepwise.

The device may comprise a unitary body that houses an inlet chamber in fluid communication with the inlet and an outlet chamber in fluid communication with the outlet, wherein the condensate drainage channel provides fluid communication between the inlet chamber and outlet chamber. Herein, unitary body may mean a manufactured (e.g. machined) object having only one part.

The condensate drainage channel or the constricted passage may be formed in a downstream wall of the inlet chamber. The downstream wall may have a convex shape with access to the condensate drainage channel or the constricted passage at its apex. For example, the downstream wall may have one or more sloping walls angled towards the apex. The sloping wails may be straight or curved. In some cases, the downstream wall includes a conical section, with access to the condensate drainage channel or the constricted passage at its tip. This arrangement may reduce the tendency for particles in the condensate to congregate in the condensate drainage channel or the constricted passage because instead they will gather around the base of the sloping walls. Fouling or blocking of the condensate drainage channel or the constricted passage may thus be reduced. In some embodiments, the magnet may preferably be disposed at the base of the sloping walls to attract and capture particles away from the access to the condensate drainage channel or the constricted passage.

The device may additionally comprise a debris strainer or filter disposed upstream of the constricted passage, arranged to prevent debris carried by the condensable gas or condensate from reaching the constricted passage. Such a debris filter works in tandem with the magnet to minimise flow of impurities to the constricted passage, reducing the chance of blockage and allowing the time period between maintenance inspections to be increased.

The terms "debris strainer" and "debris filter" are synonymous and understood to mean a partial barrier through which the condensable gas and condensate flows through, but which obstructs the passage of and therefore removes suspended solid matter. Barriers of this type are known, and include cloth, paper and porous porcelain layers. The filter or strainer may preferably be a simple mesh, sieve, or perforated sheet/layer, for example, a basket-type filter.

The debris filter or strainer is preferably arranged upstream of the magnet. In this arrangement, the debris filter collects most of the solid impurities present, and the downstream magnet captures smaller solid magnetic impurities that have passed through the debris filter. As the magnet is only collecting smaller matter, the time interval between maintenance inspections and cleaning may be increased.

It is of course possible that the magnet is formed as a debris filter or strainer, such that both large particulate matter and smaller magnetic solid particles are collected.

The inlet chamber may comprise a drainage sub-chamber and a filter sub-chamber containing a debris filter, the sub-chambers being in fluid communication with one another, and the drainage sub-chamber being disposed downstream of the filter sub-chamber. The constricted passage may be accessed via the drainage sub-chamber, i.e. it may be formed in a downstream wall of the drainage sub-chamber. The magnet may be disposed in the drainage sub-chamber. In one embodiment, the drainage sub-chamber may be angled relative to the pipeline axis. The drainage sub-chamber may include a sealable access opening which allows the interior of the drainage sub-chamber to be accessed from the outside of the device. The access opening may be closed by a cap or plug, which may be threadingly engaged with the internal surface of the drainage sub-chamber. The access opening and/or hence retention surface may be arranged to be opposite to the entrance to the constricted passage.

The magnet may be mounted in the cap or plug, and the retention surface may be the end of the cap that faces into the drainage sub-chamber. The cap or plug itself may be formed from magnetic material, e.g. a magnetic variant of stainless steel. This arrangement has the advantage that providing the magnet does not necessarily increases the number of component in the device.

The cap, plug or the like can be made from a stainless steel. Alternatively or additionally, the cap, plug or the like can include a portion formed from carbon-rich steel, which may enhance the magnetic field shape. The whole cap, plug or the like may he made from the carbon-rich steel. This arrangement may increase the surface magnetic field strength of a magnetic portion of the cap by up to 40%, typically between 25% and 30%. The magnetic portion may be formed from a magnetic variant of stainless steel, or a piece of samarium cobalt alloy. The carbon-rich steel may be galvanised, i.e. have a protective zinc coating.

The filter sub-chamber may be located upstream of the drainage sub-chamber and may house the debris filter discussed above. The filter sub chamber may be sealable by mounting a filter cap on the device, e.g. over an opening into the filter sub-chamber. This allows easy access for cleaning. The filter cap may include a drainage valve e.g. to permit cleaning by blowing out debris. Similarly to the drainage sub-chamber, the filter sub-chamber may be angled relative to the pipeline axis. The drainage sub-chamber and filter sub-chamber may be angled in a complementary manner so that they are overlie one another along the pipeline axis.

The magnet may be mounted in the device in any manner that can withstand the conditions and environment in use. In a preferred embodiment, the magnet is integrally formed in a removable insert (e.g. the cap or plug mentioned above). In other words, the removable insert itself may be formed from magnetic material. However, in other embodiment, the magnet may be attached or mounted in or on the device in any suitable manner including, for example, simple mechanical fixings such as screws and bolts.

The magnet may be dimensioned and positioned to optimise material capture, whilst maintaining a flow path through the device, i.e. without capturing sufficient material to block the flow path. Accordingly, the magnet is preferably dimensioned and/or positioned relative to the flow path such that the resulting magnetic field is not strong enough to retain sufficient material to occlude the flow path.

In one embodiment, the magnet may be disposed in the drainage sub-chamber opposite the entrance to the constricted passage. The spacing of the magnet from the entrance to the constricted passage may be selected to cause the magnetic field strength at the entrance to the constricted passage to be less than 20% of the field strength at the retention surface, preferably less than 10%, preferably less than 5%, and most preferably negligible. This arrangement may ensure an appropriate balance the ability to attract material whilst preventing the retained material from adversely affecting the operation of the device.

In another embodiment, the magnet may be mounted around the entrance to the constricted passage. Again, the spacing of the magnet from the entrance to the constricted passage may be selected to cause the magnetic field strength at the entrance to the constricted passage to be less than 20% of the field strength at the retention surface, preferably less than 10%, preferably less than 5%, most preferably negligible. As a result, the flow path may not be readily blocked by adsorbed material, thereby reducing the required cleaning frequency.

The magnetic flux density at the entrance to the constricted passage is preferably less than 30 mT, more preferably less that 20 mT, 15 mT, 10 mT and 5 mT.

The magnet is preferably positioned offset from the centre of the flow path. For a non-linear flow path, it is preferably positioned on the outside of a bend in the path, such that it at least partially faces the flow.

In some embodiments, the magnet may be a disc magnet, which are known in the art to be a generally cylindrical magnet, the magnetic axis being coaxial with the axis of the cylinder. In such cases, the magnetic axis is preferably aligned with the direction of drainage flow through the constricted passage. That is, it is preferably co-axial with the upstream end of the constricted passage. In this arrangement, the maximum build-up of adsorbed impurities occurs away from the constricted passage, i.e. a local minimum in the build-up of adsorbed material aligns with the upstream end of the constricted passage. Accordingly, more material can be captured by the magnet without blocking the constricted passage, allowing for greater intervals between cleaning.

The axis of the upstream end of the constricted passage can be defined as the line which extends from the centre of the upstream end of the constricted passage perpendicularly away from the constricted passage, i.e. an axis running perpendicularly through the aperture formed in the downstream wall of the inlet chamber and extending away from that downstream wall. Where the condensate drainage channel is linear, the axis running through the centre and along the length of the condensate drainage channel will be the same as the axis of the upstream end of the constricted channel.

In other cases in which the magnet is a disc magnet, the magnet may be angled such that the local minimum in the build-up of adsorbed material aligns with the centre of the flow path, thereby minimising the flow disruption caused by such build-up.

In alternative embodiments, the magnet may be in the form of an annular ring, arranged around the upstream end of the constricted passage with the magnetic axis running parallel to the axis of the upstream end of the constricted passage. In further alternatives, the magnet may be in the form of an annular ring, arranged around the upstream end of the constricted passage with the magnetic axis running perpendicular to the axis of the upstream end of the constricted passage.

Alternatively, several magnets may be disposed around the upstream end of the constricted passage such that their poles alternate. The magnetic axes are then perpendicular to the axis of the upstream end of the constricted passage. The magnets are preferably arranged to form a ring around the upstream end of the constricted passage. The retained material is collected between the alternating magnetic poles, in a ring-shape around the end of the constricted passage.

As mentioned above, the magnet may be attached to or formed as part of an insert which can be removably mounted between the inlet and the outlet. The insert may be mounted in any suitable manner, e.g. by interference-fit, screw or bayonet fit, snap fit or by some other form of interlock. The insert can be removed, which allows the magnet to be cleaned and otherwise maintained easily.

The insert may also carry all or part of the condensate drainage channel. This allows the passage to be readily detached from the device for cleaning and maintenance. Mounting the insert places the condensate drainage channel between the inlet and outlet. In these cases, the magnet may preferably have any of the preferred forms outlined above.

Where the device has a unitary body, it may be cast from a suitable material, e.g. stainless steel. The inlet, the outlet, the condensate drainage channel and the various chambers discussed above may be drilled out subsequently.

The magnet may comprise a samarium-cobalt alloy, which are suitable for use in the environment, inside a condensate removal device. The magnet may substantially consist of a samarium-cobalt alloy, with only negligible levels of impurities possible. Such magnets are suitable for use in condensate removal devices, in which the environment is hot, damp and the pH may vary over time.

Generally, two series of samarium-cobalt (SmCo) alloys are known. These are:

1. SmCo Series 1:5 (or SmCo5)—these have one atom of rare earth samarium and five atoms of cobalt. By weight this magnet alloy will typically contain about 36% samarium with the balance cobalt. The energy products of these samarium-cobalt alloys range from approximately 128 $kJ/m^3$ to approximately 200 $kJ/m^3$.

2. SmCo Series 2:17 (or Sm2Co17)—these are age-hardened with a composition of two atoms of rare-earth samarium and 13-17 atoms of transition metals (TM). The TM content is rich in cobalt, but may contain other elements such as iron and copper. Other elements like zirconium, hafnium, and such may also be added in small quantities to achieve better heat treatment response. By weight, the alloy will generally contain about 25% of samarium. The maximum energy products of these alloys range from about 160 to about 260 $kJ/m^3$.

A magnet comprising a SmCo series 2:17 alloy may be used in the device because it is a stronger magnet, allowing greater adsorption of impurities per weight of magnet.

Possible compositions for the magnet may comprise between 65 and 65% by weight of samarium and cobalt, preferably between 70 and 80% by weight. One example magnet composition may comprise about 26% by weight Sm, 50% by weight Co, 17% by weight Fe, 5% by weight. Cu and 2% by weight Zr.

BRIEF DESCRIPTION OF THE DRAWINGS

Examples of the inventions are described below with reference to accompanying drawings, in which:

FIG. 2 is a section view of a condensate removal device according to a second embodiment of the invention;

FIG. 3A is a section view along line A-A (FIG. 2) of a condensate removal device according to a second embodiment of the invention;

FIG. 3B is a section view along line A-A (FIG. 2) of a condensate removal device according to a variant of the second embodiment of the invention.

DETAILED DESCRIPTION; FURTHER OPTIONS AND PREFERENCES

Figure 1:
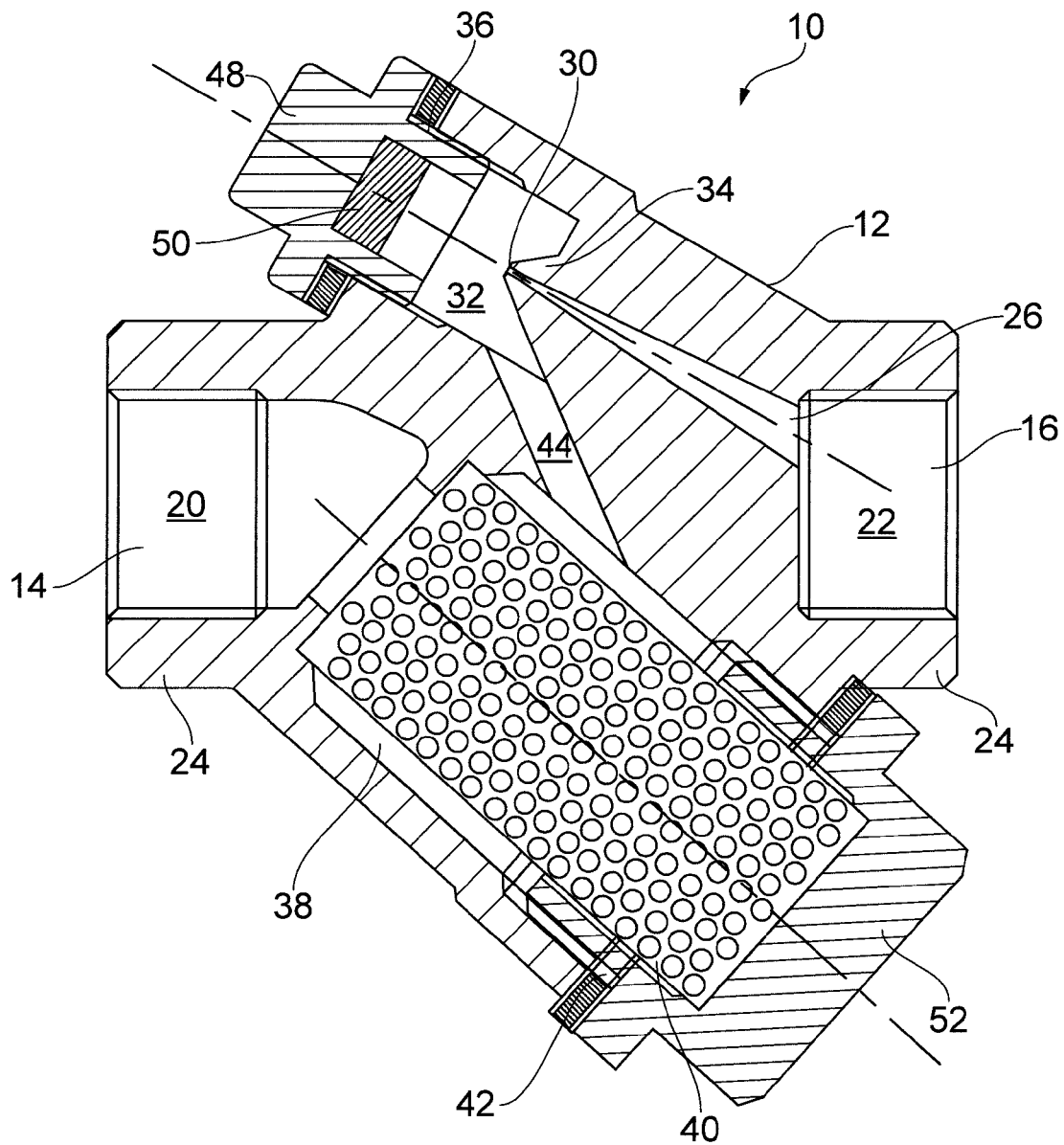
FIG. 1 is a section view of a condensate removal device according to a first embodiment of the invention.

FIG. 1 shows a condensate removal device (referred to below as a steam trap) 10 according to a first embodiment of the invention.

The steam trap 10 comprises a unitary body 12 cast from stainless steel or other suitable material. The body 12 has an inlet 14 and an outlet 16 formed on opposite sides thereof. The inlet 14 and outlet 16 are apertures leading into an inlet bored region 20 and an outlet bored region 22 respectively.

The body 12 is adapted to the connected in a pipeline (not shown). The parts 24 of the body 12 surrounding the inlet 14 and outlet 16 may be arranged to connect to external piping. For example, the parts may be arranged to form any one or more of a screwed, socket weld, and flanged to an adjacent piece of piping. In one embodiment, the parts 24 may be equipped with "quick fit" connectors (also known a pipeline connectors or universal connectors), such as those used on the Emerald Steam Trap manufactured by Thermal Energy International (UK) Limited. Alternatively or additionally, one or both of the parts 24 may comprise a standard end connection for a three-part valve (e.g. ball valve or check valve), whereby the steam trap 10 may be integrated with the valve.

The inlet 14 is arranged to receive condensable gas and/or condensate from the external pipeline. The steam trap 10 includes a linear condensate removal channel 26 which is arranged to permit condensate to flow therethrough and escape through the outlet 16, whilst restricting or preventing the escape of the condensable gas. The outlet 16 is exposed to a lower pressure than the inlet 14, so that the condensable gas and condensate received in the inlet 14 are drawn into the condensate removal channel 26.

In this embodiment the inlet bored region 20 and the outlet bored region 22 are coaxial and have equal diameters, but this need not be essential for the invention.

The condensate removal channel 26 extends away from the outlet 16. The condensate removal channel 26 comprises a constricted passage 30 (i.e. the narrowest part of the condensate removal channel 26) which performs the function of the orifice in the steam trap. In this embodiment, the constricted passage 30 is at the upstream end of the condensate drainage channel 26, but this need not be essential for the invention; it may be formed further downstream in the condensate removal channel 26. As it extends away from the constricted passage 30 towards the outlet 16, the condensate removal channel 26 flares open, i.e. gradually increases in cross-sectional area. In this embodiment, the condensate removal channel 26 has a circular cross-section, so the increase in cross-sectional area may be achieved by a linear increase in diameter of the condensate removal channel 26. When hot condensate is forced through the constricted passage 30 into the condensate removal channel 26, the pressure drop across the constricted passage causes flash boiling of the condensate, which in turn creates a variable restriction in the flow capacity of the condensate removal channel 26 which acts to inhibit passage of condensable gas through the constricted passage 30.

The diameter of the constricted passage 30, which may be constant, is selected in view of the properties of the pipeline (e.g. differential pressure between the inlet and outlet, composition of the condensable gas, etc.) such that it permits the discharge of condensate at a desired rate. The calculations involved in this selection are the same as for known types of venturi orifice traps.

The constricted passage 30 has an upstream opening located in a drainage sub-chamber 32, which is in fluid communication with the inlet 14 to receive the condensable gas and/or condensate. In this embodiment, the drainage sub-chamber 32 is accessible from the outside via an access opening 36. The access opening 36 may be used for maintenance, e.g. to clean the constricted passage 30, without removing the steam trap 10 from the pipeline. In use, the access opening 36 is closed by a cap or plug 48. The cap or plug may be threadingly engaged with the internal surface of the drainage sub-chamber 32.

Figure 4:
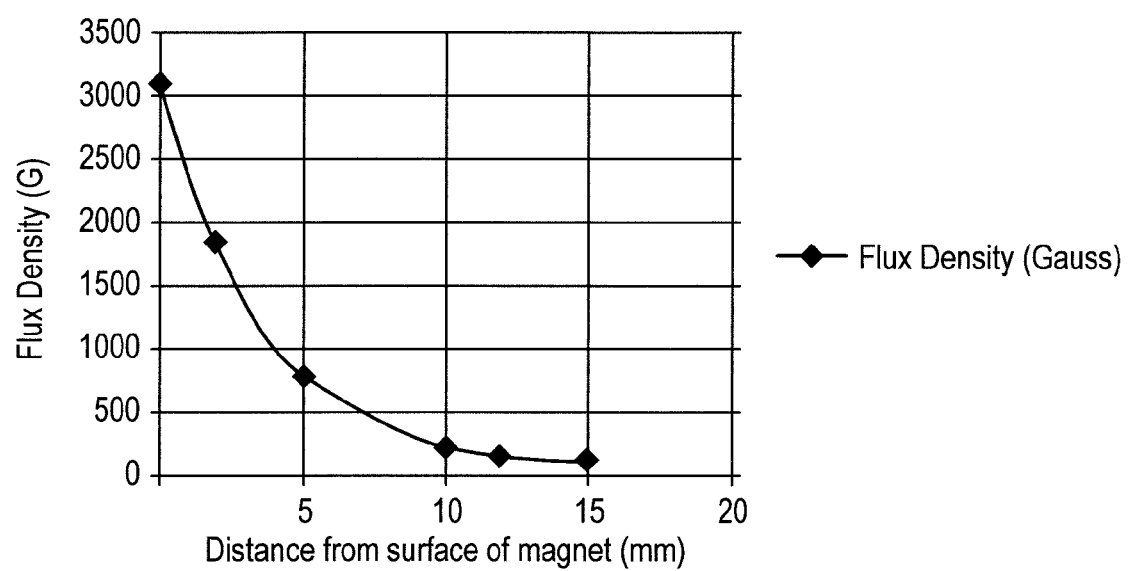
FIG. 4 is a plot of magnetic flux density against distance from the magnet surface for a disc magnet, which comprises 26% by weight Sm, 50% by weight Co, 17% by weight Fe, 5% by weight Cu and 2% by weight Zr, has a diameter of 10 mm and a depth of 5 mm.

A disc magnet 50 is attached to the inside of the plug with a high-temperature ceramic glue. The magnet comprises 26% by weight Sm, 50% by weight Co, 17% by weight Fe, 5% by weight Cu and 2% by weight Zr, has a diameter of 10 mm and a depth of 5 mm. The axis of the disc is co-axial with the axis running through the centre of the linear condensate drainage channel. The plug 48 is formed from a carbon-rich steel, and has a protective zinc coating. The distance from the surface of the disc magnet to the upstream end of the constricted passage is 12 mm. FIG. 4 shows that the magnetic flux density at the adjacent to the upstream end of the constricted passage 30 is then about 15 mT (which is about 4% of the flux density at the magnet surface). This flux density is negligible and material is not captured at a distance of 12 mm, and therefore captured impurities do not block the constricted passage 30. In practice, between 6 and 12 mm of material is captured on the retention surface, depending on the flow rate across the face of the magnet.

Whilst in some embodiments the inlet 14 may be in direct communication or formed integrally with the drainage sub-chamber 32, in the depicted embodiment the condensable gas and/or condensate travel from the inlet 14 to the drainage sub-chamber 32 via, a filter sub-chamber 38. The filter sub-chamber 38 is a hollow region (e.g. a bored region) adapted to receive a strainer 40. The strainer 40 comprises a perforated (e.g. meshed) sleeve that its in the filter sub-chamber 38 to restrict the passage of debris into the drainage sub-chamber 32.

In this embodiment, the filter sub-chamber 38 is oriented at an oblique angle with respect to the inlet and outlet, whereby it is accessible from the outside via an opening 42. The opening 42 may be used for maintenance, e.g. to clean or replace the strainer 40, without removing the steam trap 10 from the pipeline. In use, the opening 42 is closed by a cap or plug 52, which may be threadingly engaged with the internal surface of the filter sub-chamber 38.

The filter sub-chamber 38 is in fluid communication with the drainage sub-chamber 32 via a passageway 44, which may be drilled from one or both of the access opening 36 or opening 42. Alternatively, the passageway 44 may be integrally cast with the rest of the body.

The surface of the drainage sub-chamber 32 surrounding the upstream opening of the condensate drainage channel 26 is shaped as a cone 34 extending away from the outlet 16. The convex surface of the cone (i.e. the sloping surfaces leading up to the upstream opening) may assist in prevent debris from settling over the condensate drainage channel 26 or the constricted passage 30.

Further, because the disc magnet 50 is co-axial with the upstream end of the condensate drainage channel 26, a local minimum in the level of captured or adsorbed material forms which aligns with this cone 34. The cone 34 can extend into this minimum. This configuration maximises the amount of adsorbed material than can be captured without blocking the constricted passage 30.

In another embodiment of the invention comprises a variation of the embodiment shown in FIG. 1 in which the disc magnet 50 and plug 52 shown in FIG. 1 are replaced by a magnetic cap. The magnetic cap has the same or similar dimensions to the plug 52 and performs the same sealing function, but is made from a magnetic material. This embodiment thus avoids the need for a separate magnet element and for a means of attaching or otherwise securing that magnet element to the device. The magnetic material used for the cap may be made from a magnetic variant of stainless steel.

FIG. 2 is a section view of a steam trap 10 that is a second embodiment of the invention. Parts having the same function as the first embodiment are labelled with the same reference number and are not described again.

These steam traps comprise a body 12 which itself is formed from four connectable sub-components 121, 122, 123, 124. The parts 24 of the body 12 surrounding the inlet 14 and outlet 16 may be arranged to connect to external piping, in a manner as discussed above. The sub-components may connect to one another similarly. Each of the sub-components may be individually removed.

The first sub-component 121 contains the inlet 14, the filter sub-chamber 38 and the passageway 44. The second sub-component 122 contains a tubular recess which forms the drainage sub-chamber 32 when connected to the third sub-component 123.

The third sub-component 123 contains the condensate drainage channel 26, including the constricted passage 30. A surface surrounding the upstream opening of the condensate drainage channel 26 forms the drainage sub-chamber 32 when connected to the second. sub-component 122. This surface is the downstream surface of the drainage sub-chamber. As for the first embodiment, a cone 34 is formed in the surface of the drainage sub-chamber 32 surrounding the upstream opening of the condensate drainage channel 26.

In the second embodiment (shown in FIG. 3A), an annular ring magnet 60 is arranged around the cone 34. The magnetic axis runs parallel to the axis of the condensate drainage channel 26. The magnet is arranged around the base or the cone 34 to maximise the amount of material that may be adsorbed without blocking the constricted passage 30.

In a variant of the second embodiment (shown in FIG. 3B), magnets 70 are disposed around the cone 34, which have alternating magnetic poles. The magnetic axes are in a plane perpendicular to the axis of the condensate drainage channel. The magnets are arranged around the base of the cone 34 to maximise the amount or material that may be adsorbed without blocking the constricted passage 30.

In the second embodiment, the magnet composition, attachment technique and the dimension/position considerations discussed above in relation to the first embodiment apply equally.

The fourth sub-component 124 contains the outlet 16.

The invention claimed is:

1. An orifice condensate removal device for mounting in a pipeline, the device comprising:
   an inlet connectable to the pipeline to receive a condensable gas flow;
   an outlet connectable to the pipeline downstream of the inlet;
   a condensate drainage channel providing fluid communication between the inlet and outlet, which includes a constricted passage that is occludable by condensate flow therethrough to restrict condensable gas flow therethrough;
   a debris filter disposed between the inlet and the constricted passage; and
   a magnet disposed between the inlet and the constricted passage;
   wherein the debris filter is disposed upstream of the magnet.

2. An orifice condensate removal device according to claim 1, wherein:
   the magnet comprises a retention surface for retaining thereon magnetic debris attracted by the magnetic field of the magnet, and
   the magnet is spaced from the entrance to the constricted passage at a distance whereby the magnetic field strength at the entrance to the constricted passage is less than 20% of the field strength at the retention surface.

3. An orifice condensate removal device according to claim 1 comprising a removable insert mountable between the inlet and the outlet, wherein the removable insert includes the magnet.

4. An orifice condensate removal device according to claim 3, wherein the removable insert is made from magnetic material.

5. An orifice condensate removal device according to claim 3, wherein the magnet comprises a magnetic variant of stainless steel.

6. An orifice condensate removal device according to claim 3, wherein the removable insert includes at least part of the condensate drainage channel.

7. An orifice condensate removal device according to claim 3, wherein the removable insert is a cap for sealing an access opening in the device.

8. An orifice condensate removal device according to claim 1, wherein the magnet comprises samarium-cobalt alloy.

9. An orifice condensate removal device according to claim 8, wherein, the magnet is mounted in the device using a high-temperature ceramic glue.

10. An orifice condensate removal device according to claim 1, wherein the magnetic is a disc magnet and the magnetic axis is co-axial with the upstream end of the constricted passage.

11. An orifice condensate removal device according to claim 10, wherein the magnet is arranged such that the magnetic flux density at the upstream end of the constricted passage is less than 20% of the surface flux density of the magnet.

12. An orifice condensate removal device according to claim 1, wherein:
   (i) the magnet is an annular ring magnet disposed around the upstream end of the constricted passage; and/or
   (ii) several magnets are disposed around the upstream end of the constricted passage such that their poles alternate.

13. An orifice condensate removal device according to claim 1, wherein the inlet comprises an inlet chamber, the downstream wall of the inlet chamber is profiled to have an upstream-facing apex, and the upstream end of the condensate drainage channel is at the upstream-facing apex.

* * * * *